US010810639B2

(12) United States Patent
Turner (10) Patent No.: US 10,810,639 B2
(45) Date of Patent: Oct. 20, 2020

(54) AUTOMATED TRAFFIC CONTROL AND BILLING FOR BILLBOARD ADVERTISING

(75) Inventor: Charles C. Turner, Phoenix, AZ (US)

(73) Assignee: Clear Channel IP, LLC, San Antonio, TX (US)

( * ) Notice: Subject to any disclaimer, the term of this patent is extended or adjusted under 35 U.S.C. 154(b) by 1689 days.

(21) Appl. No.: 12/622,432

(22) Filed: Nov. 20, 2009

(65) Prior Publication Data

US 2011/0125588 A1    May 26, 2011

(51) Int. Cl.
*G06Q 30/04* (2012.01)
*G06Q 30/02* (2012.01)
*G06Q 40/00* (2012.01)

(52) U.S. Cl.
CPC ............ *G06Q 30/04* (2013.01); *G06Q 30/02* (2013.01); *G06Q 30/0273* (2013.01); *G06Q 40/12* (2013.12)

(58) Field of Classification Search
USPC .......................................... 340/3.44; 705/412
See application file for complete search history.

(56) References Cited

U.S. PATENT DOCUMENTS

| | | |
|---|---|---|
| 7,277,967 B2 | 10/2007 | Kao et al. |
| 7,501,941 B2 | 3/2009 | Arnold et al. |
| 2003/0149601 A1 | 8/2003 | Cabral |
| 2006/0136625 A1* | 6/2006 | Kao et al. .................. 710/67 |
| 2006/0149691 A1* | 7/2006 | Sindambiwe .............. 705/412 |
| 2007/0094707 A1 | 4/2007 | Karch |
| 2008/0010134 A1 | 1/2008 | Musumeci |
| 2008/0094246 A1* | 4/2008 | Yuan ................... G04G 15/006 340/4.35 |
| 2009/0083150 A1 | 3/2009 | Mashinsky |
| 2010/0066484 A1* | 3/2010 | Hanwright et al. ......... 340/3.44 |

OTHER PUBLICATIONS

International Searching Authority (PCT), International Search Report and Written Opinion of the International Authority for application No. PCT/US2010/002977 dated Jan. 18, 2011.

* cited by examiner

*Primary Examiner* — Saba Dagnew
(74) *Attorney, Agent, or Firm* — Garlick & Markison; Randy W. Lacasse (57) ABSTRACT

An automated traffic control and billing system for billboard advertising searches a relational database having contract terms for billboards having powered features (such as illumination), and establishes one or more approval conditions for a specific billboard based on its corresponding contract terms. An approval condition may be payment of an invoice by a due date. The system monitors compliance with the approval condition, and generates a control signal when non-compliance is detected. A local signage control unit co-located at the billboard disables operation of the powered feature in response to the control signal. In those cases where the billboard has multiple powered features, the local signage control unit can selectively disable only one of the powered features associated with the non-paying customer. The powered feature is disabled according to different means depending on its nature; in an illustrative embodiment electricity to the feature is simply turned off.

15 Claims, 5 Drawing Sheets

| File Edit View Help | | | | | | | — □ ✕ |
|---|---|---|---|---|---|---|---|
| Today's Date: 09/19/2009 | | | | | | | |
| Property | Panel # | Type | Contract Start | Contract End | Balance | Due Date | Compliance |
| 1307 Cherry Tree Dr. Orange Park, FL 32073 | 004886/ 001004 | Billboard | 05/26/2009 | 11/06/2009 | $350.00 | 10/01/2009 | Yes |
| 2502 White Ln. Macon, GA 31201 | 004961/ 001095 | Digital Signage | 09/16/2009 | 11/08/2009 | $750.00 | 10/15/2009 | Yes |
| 2182 Owen Ln Fort Myers, FL 33905 | 005013/ 001150 | Neon Signage | 12/27/2008 | 03/10/2010 | $500.00 | 1/10/2010 | Yes |
| 4403 Ryder Avenue Issaquah, WA 98029 | 005261/ 001462 | Ticker | 04/05/2009 | 07/20/2009 | $0.00 | n/a | No (contract date expired) |
| 4150 Concord St. Charlotte, NC 28209 | 005459/ 001529 | Billboard | 08/11/2009 | 02/08/2010 | $300.00 | 10/10/2009 | Yes |
| 3929 Sugarfoot Ln. Indianapolis, IN 46225 | 006006/ 000023 | Digital Signage | 03/06/2009 | 09/28/2009 | $450.00 | 06/09/2009 | No (non-payment) |
| 3126 Argonne St. Eagleville, DE 19403 | 007478/ 002239 | Neon Signage | 12/06/2008 | 12/06/2009 | $200.00 | 11/04/2009 | Yes |

FIG. 5

AUTOMATED TRAFFIC CONTROL AND BILLING FOR BILLBOARD ADVERTISING

BACKGROUND OF THE INVENTION

Field of the Invention

The present invention generally relates to advertising signage, and more particularly to a method of managing a billboard having one or more powered features such as lighting.

Description of the Related Art

Billboards are a common sight along roadways or on top of buildings. While most billboards are generally static, some have moving features and nearly all of them are supplied with lighting or some type of illumination for viewing at nighttime. Once a billboard has been erected and its advertisement has been placed, the marginal costs for maintenance are predominantly the rent and electricity required to operate the lighting and any other powered features such as motors. The power usage is typically monitored by the electric company which sends an invoice to the billboard operator or owner, who then passes on that cost to the advertising customer.

Systems have been devised for monitoring power usage in businesses. One example is the Smart Grid system marketed by Trilliant, Inc., of Redwood City, Calif. That system utilizes energy monitoring devices installed at locations throughout an electricity distribution grid. Such a system gives consumers the ability to monitor and control energy consumption comprehensively in real time across a wireless communications medium.

While such systems provide valuable tools for managing consumer assets that require electricity, due to heavy electrical loads and locations the related business processes still rely heavily on manual operations. For example, scheduling and billing systems for billboard advertising require supervision to ensure that advertising content is properly placed promoted and that payments from the advertisers have been properly received. An account manager or billing clerk for a particular billboard must check on various contract terms and continually monitor invoices that have been sent, and if payment is not received by the due date then additional manual intervention is necessary to cut-off power to the billboard or other signage and thereby mitigate any further unpaid out-of-pocket costs. Such intervention is costly. It is also helpful to be able to turn off the powered feature(s) as soon as possible after non-payment or the occurrence or non-occurrence of another event upon which operation of the billboard is contingent, in order to force the advertising customer to more quickly pay the outstanding amounts or take whatever corrective action may be appropriate according to the contract terms.

Manual involvement in these business processes increases their expense, and can add significant delays to the overall billing and scheduling process. If billboard operators do not diligently monitor both power usage costs and payment status, they can incur considerable expense which may never be recouped. Furthermore, human intervention introduces the possibility of human error, which requires even more expense and effort to remedy.

In light of the foregoing, it would be desirable to devise an improved system for managing powered billboards which could more easily police billboard usage costs and associated customer payments. It would be further desirable for the system to be less reliant on manual input and control and/or human intervention.

SUMMARY OF THE INVENTION

The foregoing objects are achieved in an advertising traffic control and billing system for billboard advertising generally comprising a workstation, remote from a billboard having at least one powered control feature (such as lighting or an electric motor), which automatically generates a control signal when non-compliance of a condition for operation of the powered feature is detected, and a local signage control unit, proximate to the billboard, which automatically disables operation of the powered feature in response to the control signal. The workstation can search for pertinent contract terms in a relational database associated with billboards, and establish the approval condition based on one or more of the contract terms for each billboard in the database. The approval condition may, for example, be payment of an invoice by a due date, the expiration of a contract, or the lighting terms of the contract. The local signage control unit can optionally monitor power usage for a specific power feature, and invoice the advertiser based on an amount of power usage for a particular feature. The workstation can further automatically monitor compliance with the approval condition, continuously or periodically, in response to user input, or as an audit feature. In cases where a billboard has multiple powered features on a single feed or meter, the local signage control unit can selectively control only one of the powered features associated with a customer agreement such as non-payment associated with a particular feature. Thus, many individual powered features for a single billboard can be controlled and disabled according to different means depending on the nature of the features; in an illustrative embodiment electricity to the feature is simply turned off.

BRIEF DESCRIPTION OF THE DRAWINGS

The present invention may be better understood, and its features made apparent to those skilled in the art by referencing the accompanying drawings.

The use of the same reference symbols in different drawings indicates similar or identical items.

DESCRIPTION OF THE PREFERRED EMBODIMENT(S)

Figure 1:
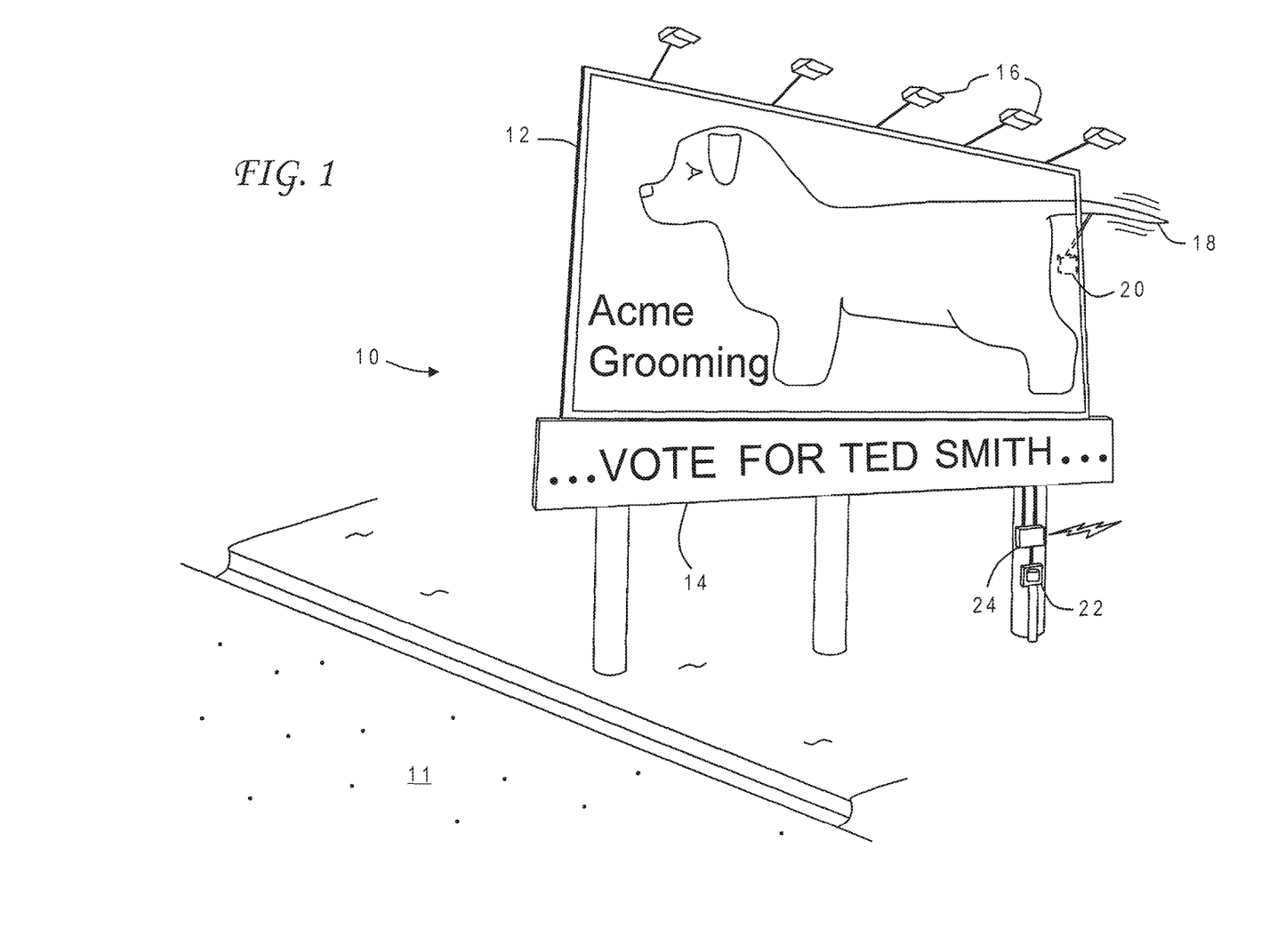
FIG. 1 is a perspective view of a roadside billboard with various powered features which are regulated by a local signage control unit in accordance with one embodiment of the present invention.

With reference now to the figures, and in particular with reference to FIG. 1, there is depicted one embodiment of a signage or billboard 10 having various powered features which can be managed in accordance with the present invention. In this example, billboard 10 is generally comprised of a main display panel 12 and a marquee or ticker 14, and is erected alongside a roadway 11. Many billboards or signage modules can be co-located in an area.

In accordance with some embodiments main display panel 12 has a vinyl sheet with graphics and text that is attached to a facing surface for advertising purposes. Top mounted lighting 16 can be attached to main display panel 12 for illumination of the graphics and text during nighttime hours. Side, bottom or ground mounted lighting can also be utilized. Main display panel 12 can also include a flickering light or dynamic aesthetics part 18 intended to attract the attention of consumers. In the illustrated embodiment, the dynamic aesthetics is a wagging dog tail whose motion is controlled by an electric motor 20 coupled to dynamic aesthetic 18 via a mechanical linkage.

Ticker 14 can display a fixed, flashing, or continuously moving text or series of messages all programmable by the billboard operator. For rolling text the messages can wrap around once the full series of messages have been displayed iteratively. Ticker 14 may have various mechanical and electrical constructions such as a banner on a belt, incandescent light bulbs, light-emitting diodes, liquid crystal display, or a plasma type display. Ticker 14 may have several associated advertising customers paying for different messages. Ticker may be able to advertise the availability of the sign to prospective advertisers. Customers may or may not include the advertising customer associated with main display panel 12.

Electricity for the various powered features of billboard 10 can be supplied by a third-party utility through an underground cable which typically terminates at a utility-owned electric meter 22. The utility provider generally takes readings from electric meter 22 and invoices the billboard operator for the total power usage, i.e., electricity for all of the powered features of billboard 10. The utility company invoices may charge different rates for times of the day and may bill based on various time periods such as daily, weekly, or monthly. A billboard operator may get a reduced rate if it agrees not to use electricity during peak hours.

A feed from electric meter 22 can supply electricity to a local signage control unit (LSCU) 24 mounted proximate to billboard 10. LSCU 24 can control and/or regulate the various powered features of billboard 10, and the operational parameters of LSCU 24 can be automated via a traffic and billing routing controlled by or programmable using a remote workstation (as further discussed below in conjunction with FIG. 2). In the illustrative embodiment LSCU 24 can communicate with the remote workstation (or an intervening communications medium) using wireless signals, e.g., radio waves or via communication signals being sent over the power line. The remote workstation can be responsible for determining whether an approval condition for one or more powered features is currently met and controlling the feature according to a set of rules and parameters defining one or more of the conditions. The approval condition can be for example non-payment of an invoice or an overdue payment owed by the advertiser, and the feature that can be controlled can be the lighting of the signage. If the approval condition has not been met, i.e., payment by a certain deadline, then the remote workstation can automatically notify LSCU 24 using an addressing methodology of the non-compliance, and LSCU 24 can responsively control the corresponding powered feature, e.g., by disabling or adjusting (increasing or decreasing) the power.

The manner in which the powered feature is disabled depends on the nature of the feature. For this example, if the advertising customer paying for main display panel 12 fails to settle the last invoice sent (or some other event occurs such as expiration of the applicable billboard advertising contract), then LSCU 24 can simply turn off the power to the corresponding power line, that is, the line powering lights 16 and electric motor 20, via a software-controlled switch. If an advertising customer for a message on ticker 14 fails to pay on time, LSCU 24 can remove that message from the series of messages being displayed so as to not interrupt advertising services for the other message customers. If the lease on the billboard is up the workstation can control a mechanical movement to display an available sign or can illuminate the available sign. The lights may flash in response to a particular phenomena detected in the database. The workstation may also adjust the intensity of the lighting based on local ordinances or may enter a power savings mode. All of these features can be controlled by the charting process operating at the remote workstation.

LSCU 24 can thus selectively disable a targeted powered feature or features when there are multiple advertising accounts represented at a single billboard or signage location or when signage has multiple powered features. In the example of FIG. 1, the contract may have expired for main display panel 12 (Acme Grooming), and one of two message customers for ticker 14 may be in default while the other is still in good standing (Ted Smith). In such a case, power to lighting 16 and electric motor 20 will be shut off in addition to removal of the defaulting customer's message, but the message for the customer in good standing will still be displayed on ticker 14.

Another example (not illustrated) of how an advertising feature may be selectively disabled involves a billboard construction where the content changes due to mechanical movements. In some embodiments a series of vertically-oriented, parallel triangular (three-sided) panels are used to provide three separate billboard images. In other words, each panel contains three segments of the three different advertisements, so when the proper set of sides is oriented outwardly from the billboard 10, the vertically-oriented panels collectively form a single image, and the panels then synchronously rotate to sequentially present three different collective images, pausing for a time between each. If the three different advertisements are being paid for by three different customers and one of them defaults on an outstanding invoice, the LSCU can then adjust the controls for the motor or servos rotating the panels to present only the two collective images associated with the two other customers that are still in good standing, so the advertisement for the defaulting customer is no longer visible. It can thus be seen that there are a variety of methods for disabling a particular feature or traffic of a powered billboard.

In the preferred embodiment, LSCU 24 can also monitor the power used by lighting 16 and motor 20 (i.e., those features associated with main display panel 12) separately from the power used by ticker 14. This feature can be accomplished by providing one power line from LSCU 24 to the features of main panel 12 and a separate power line to ticker 14, with two meters internal to LSCU 24 for the two power lines, respectively. Alternatively, separate power meters and LSCUs can be used for main display panel 12 and ticker 14 or for each individual powered feature monitored by the meter 22. These constructions allow the billboard operator to include a power usage fee in its invoices to the billboard customers, i.e., one power usage fee in the invoice to the advertiser paying for main display panel 12, and one or more separate power usage fees in the invoice(s) to the advertiser(s) paying for ticker 14. In one embodiment the charting software run by the workstation may have a parameter where a set amount of electricity is included in the monthly rent and if the power usage excess this base amount the chart software will bill the advertiser for the difference.

It can be appreciated that the billing cycle for the rent of the billboard may not match the power companies billing cycle. The period of time that an invoice covers may be the same as or different from the billing period for the utility company since LSCU 24 can provide independent metering.

LSCU 24 can optionally provide other monitoring capabilities, such as checking that the light bulbs or fixtures of illumination 16 are working, and notifying the main office if a bulb is burned out and needs replacing. This monitoring can be done by power consumption monitoring, lumen monitoring, etc. LSCU 24 may further be outfitted with additional features such as a global positioning satellite (GPS) receiver and weather monitoring sensors which provide geographic coordinates for the location of billboard 10 and the environmental conditions at the billboard wherein data from each of these sensors could be utilized in connection with the charting software to control sign electrical features.

While the foregoing description uses the specific example of a roadside billboard with a ticker, those skilled in the art will appreciate that the invention more generally applies to any kind of signage having one or more powered features. Signage generally refers to any type of graphic, image or text in any visual medium which is created to convey information to a particular audience, and includes for example but without limitation banners, billboards, neon signs, electronic displays, posters, murals or rooftops.

Figure 2:
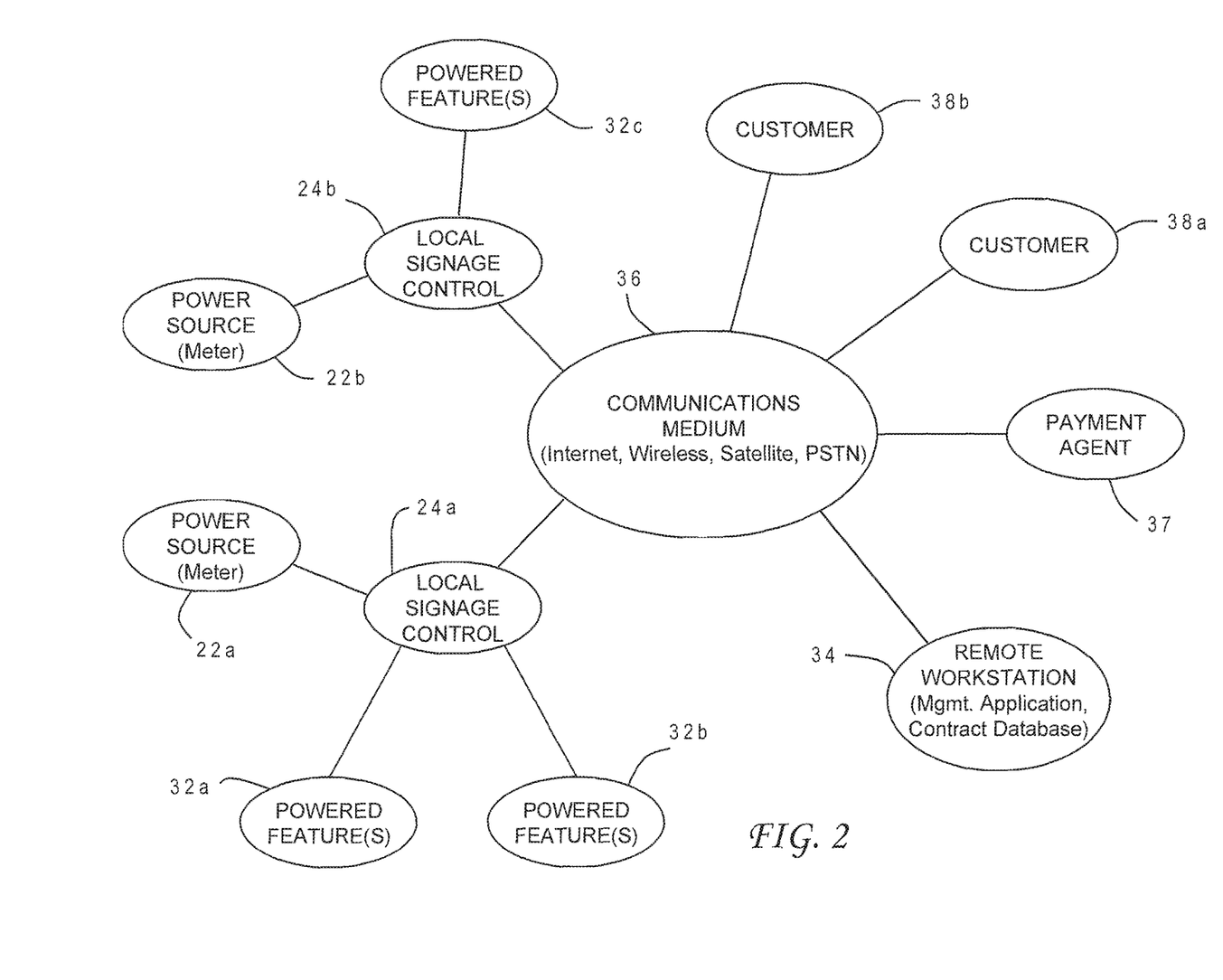
FIG. 2 is a block diagram illustrating components of an automated traffic control and billing system constructed in accordance with the present invention, and adjunct components, which are interconnected by a communications medium.

Referring now to FIG. 2, LSCU 24 may be implemented as part of a larger automated traffic control and billing system one embodiment of which is illustrated as system 30. System 30 can manage multiple powered billboards by means of multiple LSCUs 24a, 24b. LSCU 24a can regulate power from power supply 22a to control powered features 32a, 32b at one billboard location, and LSCU 24b can regulate power from power supply 22b to control powered feature 32c at a second billboard location. Both of the LSCUs 24a, 24b can be programmed and further controlled by remote workstation 34. Two-way communication and feedback between a given LSCU 24a, 24b and remote workstation 34 is provided by any convenient communications medium 36 including but not limited to the Internet, wireless (radio or cellular), satellite, public switched telephone network (PSTN), power line based communications, or any combination of the foregoing, including some form of direct wiring. Remote workstation 34 can distinguish between different LSCUs and issue control signals and commands to targeted LSCUs using unique identification numbers assigned to each LSCU, or other identifying numbers that may be usable with communications medium 36 such as a media access control (MAC) number. Communications between the LSCUs and the remote workstation may be protected using encryption, or other security features.

Remote workstation 34 preferably facilitates a charting process, a billboard control process, and a relational database having contract details relating to billboard advertising traffic and billing for various billboards or other signage, particularly the billboards controllable by LSCUs 24a, 24b. For each signage asset of a billboard company, the contract database may for example include a billboard identifier, advertiser information such as a name or identification number, contract start and end dates, payment terms used to establish payment due dates, billing terms, late payment terms, power saver terms, an indicator for direct billing, the number of electrical features, lighting terms, and other terms such as whether a customer is to be charged a flat fee, a not-to-exceed fee or a power usage fee. The contract database may also provide operating parameters such as the times of the day that lighting or another powered feature is to be turned on, or advertising content for billboards having programmable advertising media which can be relayed to the appropriate LSCUs via communications medium 36. The database information can be input by the billboard operator and can be updated from time to time. The charting or contract database may alternatively be located at another workstation (not shown) and can be retrieved by remote workstation 34 across a computer network such as the Internet. The contract database may further be distributed across multiple storage locations.

Remote workstation 34 can include a charting application or one or more billboard management software applications which establishes one or more approval conditions for a powered feature of each managed signage, that is, features which require a power supply and in particular electricity. The approval conditions can relate to contract terms contained in the contract database and other circumstances, specifically monetary. For example, the billboard management software application may base the approval condition on a combination of a booking status, a booking start date, a booking finish date, and a panel posted date. First, the booking status must be valid. Valid booking status codes can include: Guarantee Sold; Preemptable With Notice Sold; Preemptable Without Notice Sold; Non Guarantee Sold; Guarantee Hold; Preemptable With Notice Hold; Preemptable Without Notice Hold; and Non Guarantee Hold. If the booking status is not one of these valid codes the signage is non-compliant with the approval condition. According to some embodiments, in addition to a valid booking status the booking start date must be on or before the current date (today) and the booking finish date must be on or after five days prior to the current date (today-5), which allows the signage to remain powered up to five days after the booking finished; alternatively, the panel posted date must be before the booking start date, the panel posted date must further be on or before the current date, and the booking start date must be on or after the current date, which allows for early postings. Some approval conditions can be set as a default for all signage managed by the billboard management software, and other conditions can be directly programmed by the billboard operator. In some embodiments, searches for conditions can be conducted at specific times such as when a new day begins (after midnight) or when it gets dark locally. In other words, a change in the date or hour can trigger a compare function to determine conditions based on the rules.

In the illustrative implementation, the billboard management software can further automatically monitor compliance with the approval condition(s). The monitoring may be continuous or periodic (e.g., daily, weekly, or monthly). The monitoring period can further coincide with a billing schedule or cycle of the billboard operator. Compliance may be verified by examination of the relational database which includes flags or indicators for each required approval condition. For example, a "contract current/expired" flag can be automatically set on or off based on the current date detected by remote workstation 34, and contract start and end dates in the contract database specific to the signage, a "billing" flag can be automatically set on or off based on a comparison of the current billing code in the database for that signage to a predefined set of valid billing codes, and a "good standing" flag can be set on as a default value and then switched off if a payment due date passes without payment confirmation. Payment confirmation can be received electronically through an appropriate application program interface (API) of the billboard management software which receives payment instructions or other confirmation from a payment agent 37, e.g., a banking institution. Alternatively, payment confirmation may be manually entered by an accounting clerk for the billboard operator.

Once remote workstation 24 detects that the signage is not in compliance with the approval condition(s), it can automatically generate a control command or signal and transmit that control signal to the corresponding LSCU. In response to the control signal, the targeted LSCU automatically disables the powered feature as discussed above, and the feature remains disabled until further instructions are provided to the LSCU by remote workstation 34. If the advertising customer comes back into good standing by paying an overdue invoice, remote workstation 34 can detect the renewed compliance once the database flag is reset, and then automatically send a different control signal to the LSCU instructing it to re-enable the powered feature.

Any time remote workstation issues the control signals to disable or enable a given billboard, it can concurrently generate one or more reports. For example, it can generate and locally store a report for the billboard operator indicating what action was taken and why (which approval condition was not in compliance). A separate report may be sent to the appropriate customer 38a, 38b explaining the reason for suspending the signage operation, and perhaps reminding the customer of any overdue invoice or providing a more serious warning.

While some features of the invention have been described as residing in LSCU 24 and some features of the invention have been described as residing in remote workstation 34, these specific descriptions should not be construed in a limiting sense as the features can be implemented at different locations according to alternative embodiments of the invention. For example, various information contained in the relational database which is preferably stored with remote workstation 34 may instead be downloaded to and stored in the respective LSCUs, which can in some embodiments themselves be stand-alone workstations similar to remote workstation 34. Conversely, much of the logic and data which has been described as being located in the LSCUs could instead be located at the remote workstation with "dumb" LSCUs operating primarily as switches for the power lines with minimal control logic and communications circuitry, e.g., a modem (telephone, cable or wireless).

Figure 3:
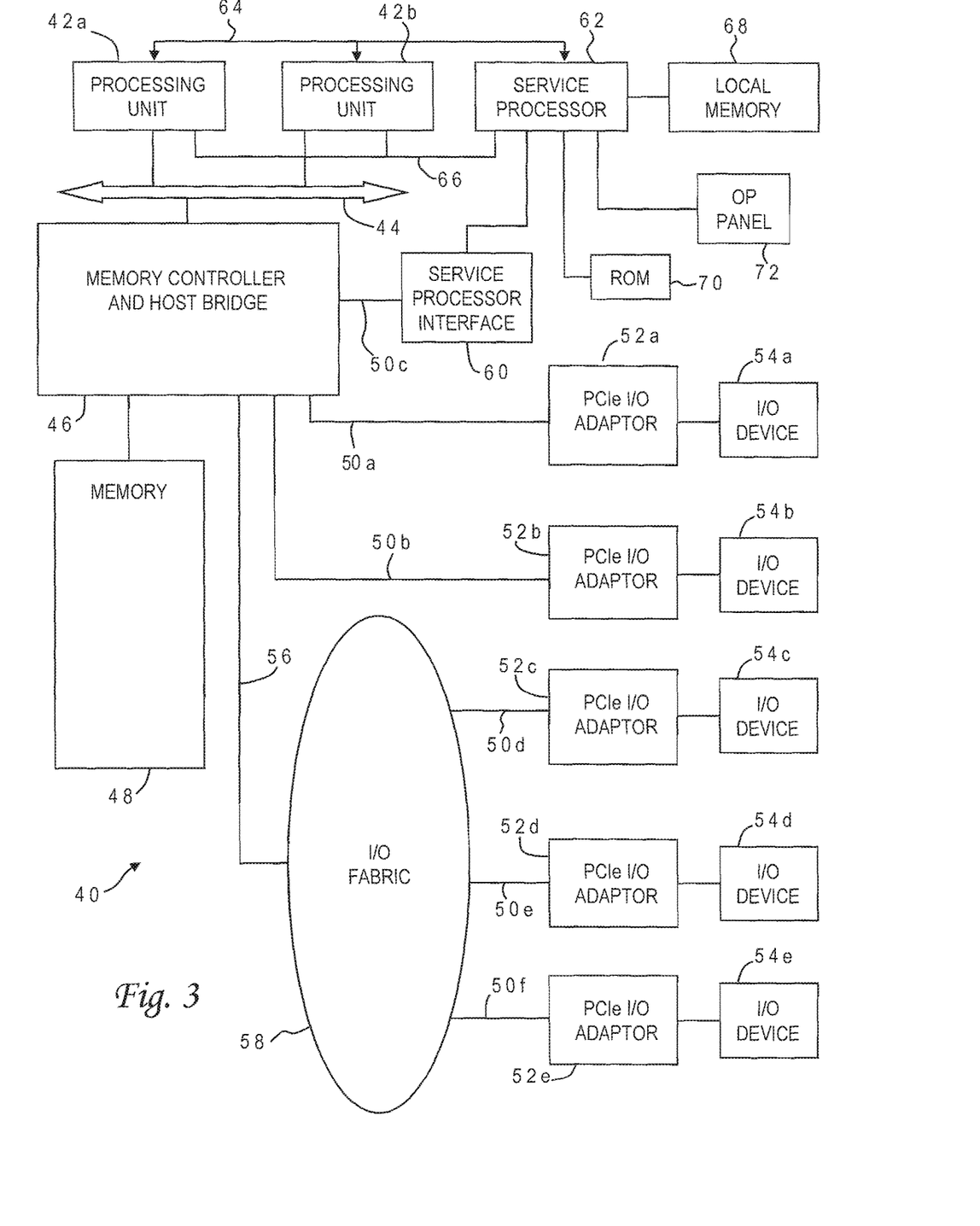
FIG. 3 is a block diagram of a computer workstation programmed to carry out powered signage management in accordance with one implementation of the present invention.

With further reference to FIG. 3, there is depicted one embodiment 40 of a computer system in which the present invention may be implemented to carry out the automated management of billboards and other signage having powered features. Computer system 40 is a symmetric multi-processor (SMP) system having a plurality of processors 42a, 42b connected to a system bus 44. System bus 44 is further connected to a combined memory controller/host bridge (MC/HB) 46 which provides an interface to system memory 48. System memory 48 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 46 also has an interface to peripheral component interconnect (PCI) Express links 50a, 50b, 50c. Each PCI Express (PCIe) link 50a, 50b is connected to a respective PCIe adaptor 52a, 52b, and each PCIe adaptor 52a, 52b is connected to a respective input/output (I/O) device 54a, 54b. MC/HB 46 may additionally have an interface to an I/O bus 56 which is connected to a switch (I/O fabric) 58. Switch 58 provides a fan-out for the I/O bus to a plurality of PCI links 50d, 50e, 50f. These PCI links are connected to more PCIe adaptors 52c, 52d, 52e which in turn support more I/O devices 54c, 54d, 54e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 46 provides a low latency path through which processors 42a, 42b may access PCI devices mapped anywhere within bus memory or I/O address spaces. MC/HB 46 further provides a high bandwidth path to allow the PCI devices to access memory 48. Switch 58 may provide peer-to-peer communications between different endpoints and this data traffic does not need to be forwarded to MC/HB 46 if it does not involve cache-coherent memory transfers. Switch 58 is shown as a separate logical component but it could be integrated into MC/HB 46.

In this embodiment, PCI link 50c connects MC/HB 46 to a service processor interface 60 to allow communications between I/O device 54a and a service processor 62. Service processor 62 is connected to processors 42a, 42b via a JTAG interface 64, and uses an attention line 66 which interrupts the operation of processors 42a, 42b. Service processor 62 may have its own local memory 68, and is connected to read-only memory (ROM) 70 which stores various program instructions for system startup. Service processor 62 may also have access to a hardware operator panel 72 to provide system status and diagnostic information.

In alternative embodiments computer system 40 may include modifications of these hardware components or their interconnections, or additional components, so the depicted example should not be construed as implying any architectural limitations with respect to the present invention.

When computer system 40 is initially powered up, service processor 62 uses JTAG interface 64 to interrogate the system (host) processors 42a, 42b and MC/HB 46. After completing the interrogation, service processor 62 acquires an inventory and topology for computer system 40. Service processor 62 then executes various tests such as built-in-self-tests (BISTs), basic assurance tests (BATs), and memory tests on the components of computer system 40. Any error information for failures detected during the testing is reported by service processor 62 to operator panel 72. If a valid configuration of system resources is still possible after taking out any components found to be faulty during the testing then computer system 40 is allowed to proceed. Executable code is loaded into memory 48 and service processor 62 releases host processors 42a, 42b for execution of the program code, e.g., an operating system (OS) which is used to launch applications and in particular the billboard management software application of the present invention, results of which (e.g., reports) may be stored in a hard disk drive of the system (an I/O device 54). The hard disk drive may also store the relational database containing the various contract terms for the billboard operator's signage assets. While host processors 42a, 42b are executing this program code, service processor 62 may enter a mode of monitoring and reporting any operating parameters or errors, such as the cooling fan speed and operation, thermal sensors, power supply regulators, and recoverable and non-recoverable errors reported by any of processors 42a, 42b, memory 48, and MC/HB 46. Service processor 62 may take further action based on the type of errors or defined thresholds.

While the illustrative implementation provides program instructions embodying the present invention on a disk drive of computer system 40, those skilled in the art will appreciate that the invention can be embodied in a program product utilizing other computer-readable storage media. The program instructions may be written in the C++ programming language for a Windows® environment or in other programming languages suitable for other operating system platforms. Computer system 40 carries out program instructions for a novel billboard traffic control and billing system that links billboard scheduling and billing systems. Accordingly, a program embodying the invention may include conventional aspects of various scheduling and billing tools, and these details will become apparent to those skilled in the art upon reference to this disclosure.

Figure 4:
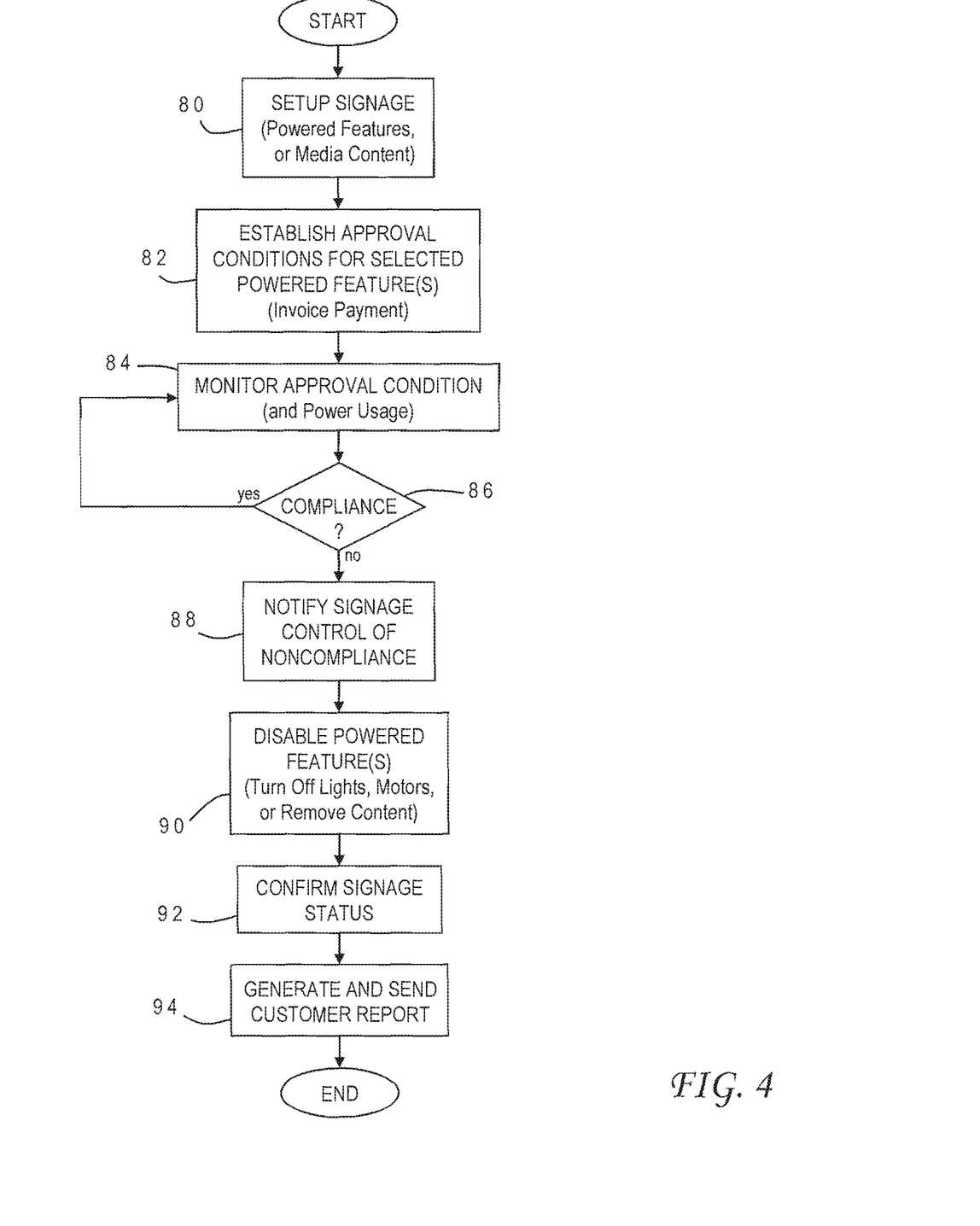
FIG. 4 is a chart illustrating the logical flow for managing powered features of a billboard or other signage in accordance with certain implementations of the present invention.

The present invention may be further understood with reference to the chart of FIG. 4 which illustrates the logical flow for a billboard management process in accordance with one implementation of the present invention. The process begins by setting up the signage (80), i.e., installing powered features or programming electronic displays which are connected to the local signage control unit. The approval conditions for the signage are established at the remote workstation located in an office of the billboard operator (82). The remote workstation monitors the approval condition while the local signage control unit monitors power usage by the signage features (84), and checks for compliance with the approval conditions (86). While the approval conditions are met, the process loops back to block 86 and repeats the monitoring, either continuously or periodically. During this time the approval conditions may change or be updated. If any of the approval conditions fail, the remote workstation notifies the local signage control of noncompliance (88). The corresponding powered feature of the signage is disabled (90), and the local signage control unit can send a confirmation signal back to the remote workstation indicating that the feature has been appropriately disabled (92). The remote workstation can then generate and send the advertising customer an electronic report (94), concluding the process.

Figure 5:
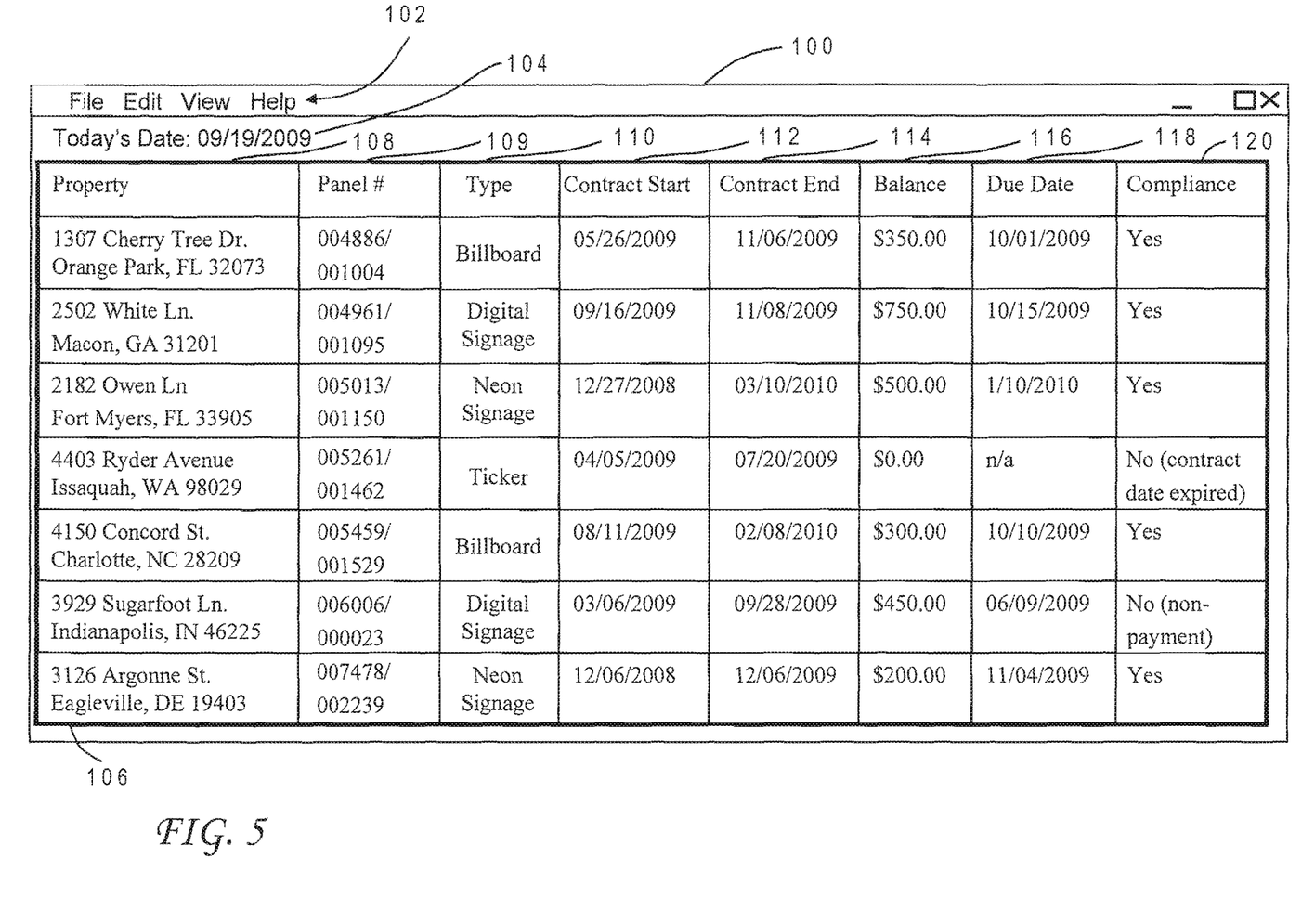
FIG. 5 is a screenshot of a graphical user interface designed in accordance with one implementation of the present invention which provides for each managed signage various fields including a compliance field explaining why any signage should be disabled.

FIG. 5 shows a screenshot for one example of a graphical user interface (GUI) 100 which may be provided by computer system 40 for operating a billboard management software application in accordance with one implementation of the present invention. GUI 100 is displayed on a video output device (CRT, LCD, LED, plasma, etc.) of computer system 40, i.e., an I/O device 54, and includes menu items 102, the current date 104, and spreadsheet 106. The columns of spreadsheet 106 include property column 108, panel number column 109, type column 110, contract start date column 112, contract end date column 114, balance column 116, due date column 118, compliance column 120. Each row in the spreadsheet refers to a specific property which is being managed and monitored. Property column 108 displays an address or other descriptive information for each individual property listed in spreadsheet 106, and panel number column 109 provides a unique identification number for each property. Type column 110 specifies the type of signage media. Any balances due and the due dates are shown in columns 116, 118. Compliance column 120 gives an indication of whether the signage should be powered and, if not, a reason for non-compliance.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of managing powered billboards by a workstation, comprises:
   storing, in a relational database, customer contracted condition data defining parameters for at least one condition of a plurality of conditions related to operation of a plurality of the powered billboards, the customer contracted condition data including at least customer contracted financial compliance parameters related to a customer's reservation of a powered feature of a plurality of powered features of the powered billboards located at a plurality of physical location, wherein the plurality of powered features include one or more of: lighting, motor operation or content display;
   establishing at least one approval condition, related to the powered feature, including a requirement that the customer contracted financial compliance parameters match one of a plurality of predetermined contracted financial booking status conditions;
   monitoring customer compliance with the at least one approval condition;
   setting a flag, in the relational database, indicative of the customer compliance or a non-compliance with the at least one approval condition; and
   generating a control signal in response to a non-compliance with the at least one approval condition of a targeted powered billboard at a target location of the plurality of physical locations;
   transmitting, via the workstation, the control signal to a local signage control unit (LSCU) at the targeted powered billboard;
   selectively disabling, through the LSCU, only the powered features associated with the non-compliance of the targeted powered billboard responsive to the transmitted control signal without disabling powered features not associated with the non-compliance; and
   receiving via the workstation, responsive to the transmitted control signal, a confirmation signal from the LSCU indicating the disabling of the powered feature of the targeted powered billboard.

2. The method of claim 1, wherein the monitoring is performed periodically.

3. The method of claim 1, wherein the at least one approval condition further includes a requirement of payment of an invoice by a due date.

4. The method of claim 3 further comprises:
   monitoring power usage by the powered feature; and
   including an amount in the invoice based on the power usage.

5. The method of claim 1, wherein the powered billboard has multiple powered features, and the selectively disabling disables only one of the plurality of powered features.

6. The method of claim 1, wherein the powered billboard is a billboard electronic display.

7. The method of claim 1, wherein the powered feature is disabled by disrupting electricity to the powered feature.

8. A contract management and billing system for an electronic billboard, comprises:

a workstation, located remotely from the electronic billboard having a plurality of powered features, wherein the plurality of powered features include one or more of: lighting, motor operation or content display, and wherein the workstation, based on both a booking status condition and in response to detecting that a payment due date associated with operation of a subset of the plurality of powered features has passed without payment confirmation, sets a flag in a relational database indicative of customer compliance with contacted parameters and generates, for flag indicating customer non-compliance, a control signal in response indicating that the subset of the plurality of powered features of the electronic billboard are to be disabled, the workstation transmitting the control signal, wherein powered features not part of the subset are not disabled; and a local signage control unit, proximate to the electronic billboard, which in response to receipt of the transmitted control signal, disables operation of the subset of the plurality of powered features of the electronic billboard and transmits a confirmation signal indicating disablement of the subset of the plurality of powered features.

9. The contract management and billing system of claim 8, wherein the workstation searches the relational database including contract terms for a plurality of signs including the electronic billboard, and establishes an approval condition based on one or more of the contract terms for the electronic billboard.

10. The contract management and billing system of claim 9, wherein the approval condition includes a valid booking status condition, the valid booking status condition providing a valid indication related to customer reservation of a powered feature of the plurality of powered features of the electronic billboard.

11. The contract management and billing system of claim 8, wherein the local signage control unit monitors power usage by the plurality of powered features, and an invoice generated by the contract management and billing system includes an amount based on power usage by the subset of the plurality of powered features.

12. The contract management and billing system of claim 9, wherein the workstation automatically monitors customer compliance with the approval condition.

13. The contract management and billing system of claim 12, wherein the workstation monitoring is performed periodically.

14. The contract management and billing system of claim 8, wherein the local signage control unit selectively disables only one of the plurality of powered features.

15. The contract management and billing system of claim 8, wherein at least one of the subset of the plurality of powered features is disabled by switching electricity to the at least one of the subset of the plurality of powered features off.

* * * * *